US006996823B1

(12) United States Patent
Basso et al.

(10) Patent No.: US 6,996,823 B1
(45) Date of Patent: Feb. 7, 2006

(54) INTER PROCESS COMMUNICATIONS IN A DISTRIBUTED CP AND NP ENVIRONMENT

(75) Inventors: Claude Basso, Raleigh, NC (US); Philippe Damon, Carrboro, NC (US); Anthony Matteo Gallo, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/544,314

(22) Filed: Apr. 6, 2000

(51) Int. Cl.
    G06F 3/00      (2006.01)
    G06F 9/44      (2006.01)
    G06F 9/46      (2006.01)
    G06F 13/00     (2006.01)

(52) U.S. Cl. ...................... 719/313; 709/203
(58) Field of Classification Search ......... 709/310–319
    See application file for complete search history.

(56) References Cited

U.S. PATENT DOCUMENTS 5,644,719 A * 7/1997 Aridas et al. ............... 709/223
5,802,278 A * 9/1998 Isfeld et al. ................ 709/249
5,878,225 A * 3/1999 Bilansky et al. ............ 709/227
6,233,619 B1 * 5/2001 Narisi et al. ................ 709/230

* cited by examiner

Primary Examiner—Wm. Thomson
Assistant Examiner—Diem Cao
(74) Attorney, Agent, or Firm—Greenblum & Bernstein, P.L.C.; Joscelyn G. Cockburn

(57) ABSTRACT

A lightweight, low cost solution provides inter process communications (IPC) in a network processing environment. A method of inter process communication (IPC) between General Purpose Processors in a network processing environment uses software based functions (Application Program Interfaces (APIs)) that enable inter process communication between processors in a network processing environment. The software enabled functions open and close inter process communication paths for transmitting and receiving of inter process communication frames and allow the inter process communication frames to be transmitted to one or several processors in said network processing environment. The software has the capability of selecting either data or control path in said network processing environment to transmit or receive said inter process communication frames.

11 Claims, 2 Drawing Sheets

US 6,996,823 B1

INTER PROCESS COMMUNICATIONS IN A DISTRIBUTED CP AND NP ENVIRONMENT

BACKGROUND OF THE INVENTION

1. Field of the Invention

The present invention generally relates to a method of providing lightweight inter process inband communication and, more particularly, to a method that allows for information exchange between blades in a network processing environment.

2. Background Description

Today's methods of providing inter process communication among components in a distributed network processing environment typically involves two options:

(1) External back-plane blade-to-blade ethernet connection, or
(2) Internet Protocol (IP) stack on each blade.

External back-plane ethernet connections tend to impact performance while implementing an IP stack on each blade increases cost and requires additional management.

SUMMARY OF THE INVENTION

It is therefore an object of the present invention to provide a lightweight, low cost solution that provides inter process communications (IPC) in a network processing environment.

According to the invention, there is provided a method of inter process communication (IPC) between processors in a network processing environment. The invention comprises software enabled functions that open and close inter process communication paths for transmitting and receiving of inter process communication frames and software enabled functions that allow said inter process communication frames to be transmitted to one or several processors in the network processing environment. The software has the capability of selecting either data or control path in said network processing environment to transmit or receive said inter process communication frames.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
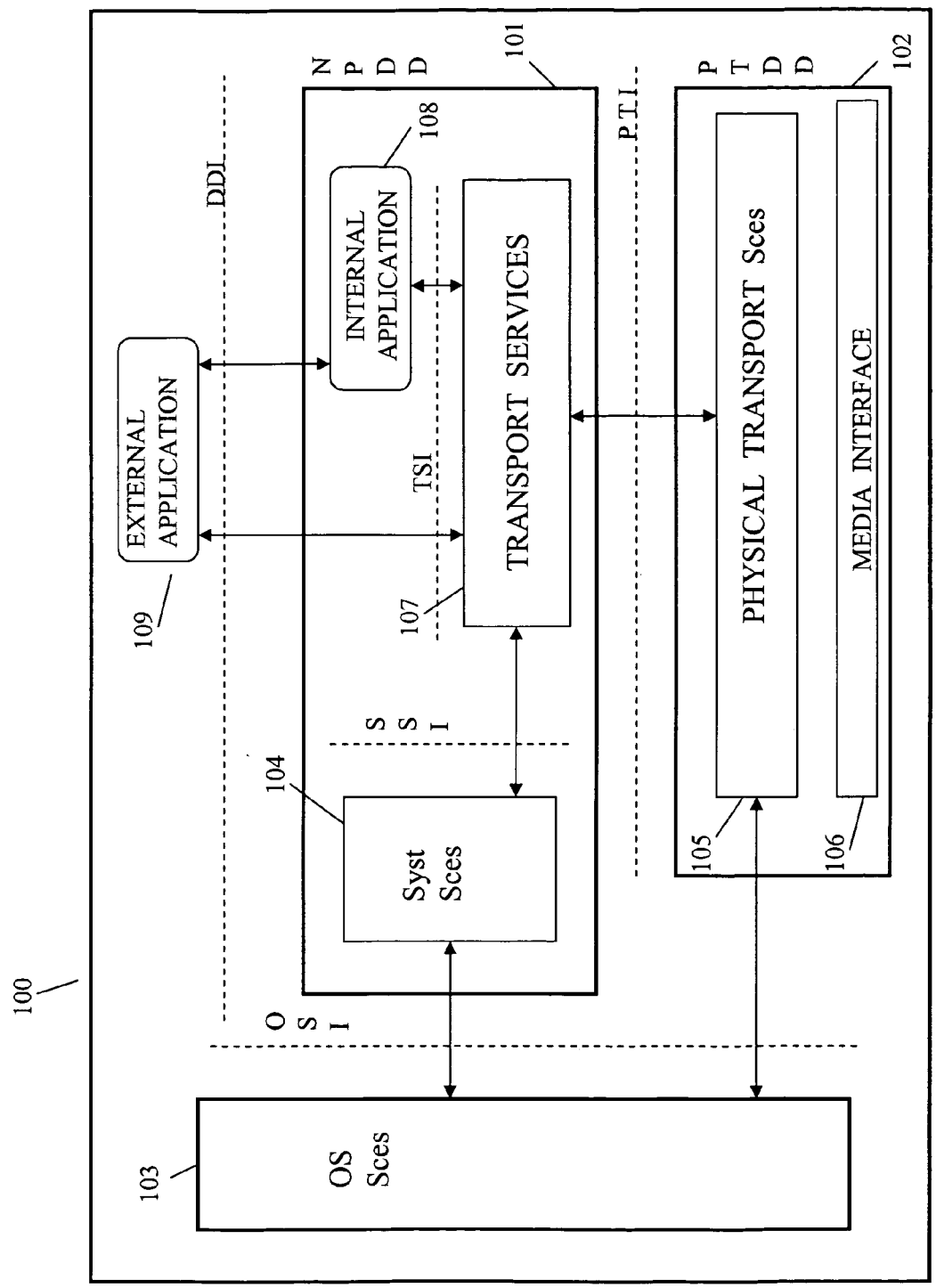
FIG. 1 is a block diagram of the Network Processor Transport Services (NPTS) in a General Purpose Processor on which the invention may be implemented.

Referring now to the drawings, and more particularly to FIG. 1, there is shown a block diagram of a Network Processor Transport Services (NPTS) 100 in a Network Processor. FIG. 1 identifies the flows between the NPTS components. More particularly, the NPTS 100 comprises a Network Process Device Driver (NPDD) 101 and a Physical Transport Device Driver (PTDD) 102 supported by an Operating System Services (OS Sces) 103. The Operating System Services 103 interfaces, through Operating System Interface (OSI), with the Network Process Device Driver 101 via System Services (Syst Sces) 104 and with the Physical Transport Device Driver via Physical Transport Services 105. The Physical Transport Device Driver 102 supports a media interface 106. The Physical Transport Services 105 interfaces, through Physical Transport Interface (PTI), with the Transport Services 107 of the Network Processor Device Driver 101. The Transport Services 107 interfaces, through System Services Interface (SSI), with System Services 104 and, through Transport Services Interface (TSI), with internal application 108 and, additionally through Device Driver Interface (DDI), with external application 109.

The role of the NPTS 100 is to provide a transmit/receive function to applications which may be internal and external to the Network Processor Device Driver (NPPD) 101. Particularly, it entirely hides the nature of the underlying Physical Transport Services (PTS) 105. Also, it is the privileged interface to communicate with the Network Processor (NP) by handling the headers necessary to exchange various frame formats.

The PTS 105 is responsible for handling the transmission and the reception of frames on the actual media. It is defined so that it shows a consistent interface to the NPTS 100 regardless the hardware used to communicate to the media. The Application Program Interface (API) between the NPTS 100 and PTS 105 is made of two functions which are called synchronously from each of those two components. As shown in FIG. 1, the PTS 105 is not part of the NPDD 101.

The NPTS 100 supports the following frame formats and flows:

Control flows based on guided frames
Data flows based on data frames
Inter Process Communication (IPC) flows based on data frames IPC flows are the nature of this invention. This invention consists of APIs (Application Program Interfaces) that enable lightweight inter process communication in a network processor environment. These APIs and their respective functions are (API names are provided for ease of reference):

| API Name | Function |
| --- | --- |
| np_ts_IPC_register | Open the software transmit/receive IPC path of the NPTS |
| np_ts_IPCderegister | Close the software transmit/receive IPC path of the NPTS |
| np_ts_sndIPC_unicast | Transmit an IPC frame to a given processor (Control Point identified by a given interface, but there is no lookup done on ingress side of the Network Processor (NP) |
| np_ts_sndIPC_multicast | Transmit an IPC frame to a set of given processors (Control Points) identified by a set of given interfaces |

Provided here is sample code that embodies each of these functions. It should be obvious to those skilled in the art that these functions are just examples and can be structured in several ways to obtain the same result.

np_ts_IPC_register
    np_return_code_t np_ts_IPC_register(
        np_user_context_t user_context,
        np_user_path_t user_path
        np_return_code_t (*user_rcvIPC_func)( ),
        np_user_handle_t *user_handle);

Two return codes are received after this function has been called: NP received successfully (NP received valid parameters) or NP did not receive successfully (NP received invalid parameters). The parameters in this function called are explained here:

user_context identified the context for the user.
user_path identified the control or data path used for this registered IPC.
user_rcvIPC_func is a pointer on the receive data function which is to be called when an IPC frame is received. It must have the following prototype:
   np_return_code_t user_rvcIPC_func(
      np_user_context_t user_context,
      np_Rbuf_s *Rbuf,
      np_itf_id_s itf_id);
   user_context is the user context which was registered.
   Rbuif is the Raw buffer which contains the received frame. The length of the data frame and the address of the start of the frame must be set in the Raw buffer.
   itf_id is the source interface identifier which identifies the sender of this IPC frame.
   user_handle returns an identification of the registered user in the NPTS for IPC.
np_ts_IPC_deregister
   np_return_code_t np_ts_IPC_deregister(
      np_user_handle_t user_handle); Two return codes are received after this function has been called: NP received successfully (NP received valid parameters) or user entry was not found by NP (user was not registered). The parameters in this function called are explained here:
user_handle identifies the registered user in the NPTS for IPC.
np_ts_sndIPC_unicast
   np_return_code_t np_ts_sndIPC_uniscast(
      np_user_handle_t user_handle,
      np_Rbuf_s *Rbuf,
      np_itf_id_s itf_id,
      void (*userCompletion_func)( );
Two return codes are received after this function has been called: NP received successfully (NP received valid parameters) or NP did not receive successfully (NP received invalid parameters). The parameters in this function called are explained here:
user_handle identifies the registered user in the NPTS for IPC.
Rbuf is the Raw buffer which contains the IPC frame. The length of the frame and the address of the start of the frame must be, set in the Raw buffer.
itf_id is the interface identifier which corresponds to the destination processor to send the IPC frame to.
userCompletion_func is a pointer on a completion function which is to be called at the end of the frame transmission. It is related to the ownership of the Raw buffer.
np_ts_sndIPC_multicast
   np_return_code_t np_ts_sndIPC_uniscast(
      np_user_handle_t user-handle,
      np_Rbuf_s *Rbuf,
      np_mid_t mid,
      void (*userCompletion_func)( );
Two return codes are received after this function has been called: NP received successfully (NP received valid parameters) or NP did not receive successfully (NP received invalid parameters). The parameters in this function called are explained here:
user-handle identifies the registered user in the NPTS for IPC.
Rbuf is the Raw buffer which Contains tho IPC frame. The length of the frame and the address of the start of the frame must be set in the Raw buffer.
mid is a multicast identifier which allows to reach a set of destination processors.
userCompletion_func is a pointer on a completion function which is to be called at the end of the frame transmission. It is related to the ownership of tho Raw buffer.

This invention enables information exchange between processors in a network processing environment without requiring an IP stack on each General Purpose Processor and not requiring additional overhead (i.e., external ethernet connection). By providing functions that enable inter process communication among processors, software enabled information exchange is possible through either data or control paths that physically exist in a NP. These functions not only enable processors in an network processing environment to communicate amongst each other, but they also enable the end user to decide which path to transmit information on (i.e., either data or control path). If bandwidth is crucial, the data path would be chosen. If high priority is crucial, the control path would be chosen.

Figure 2:
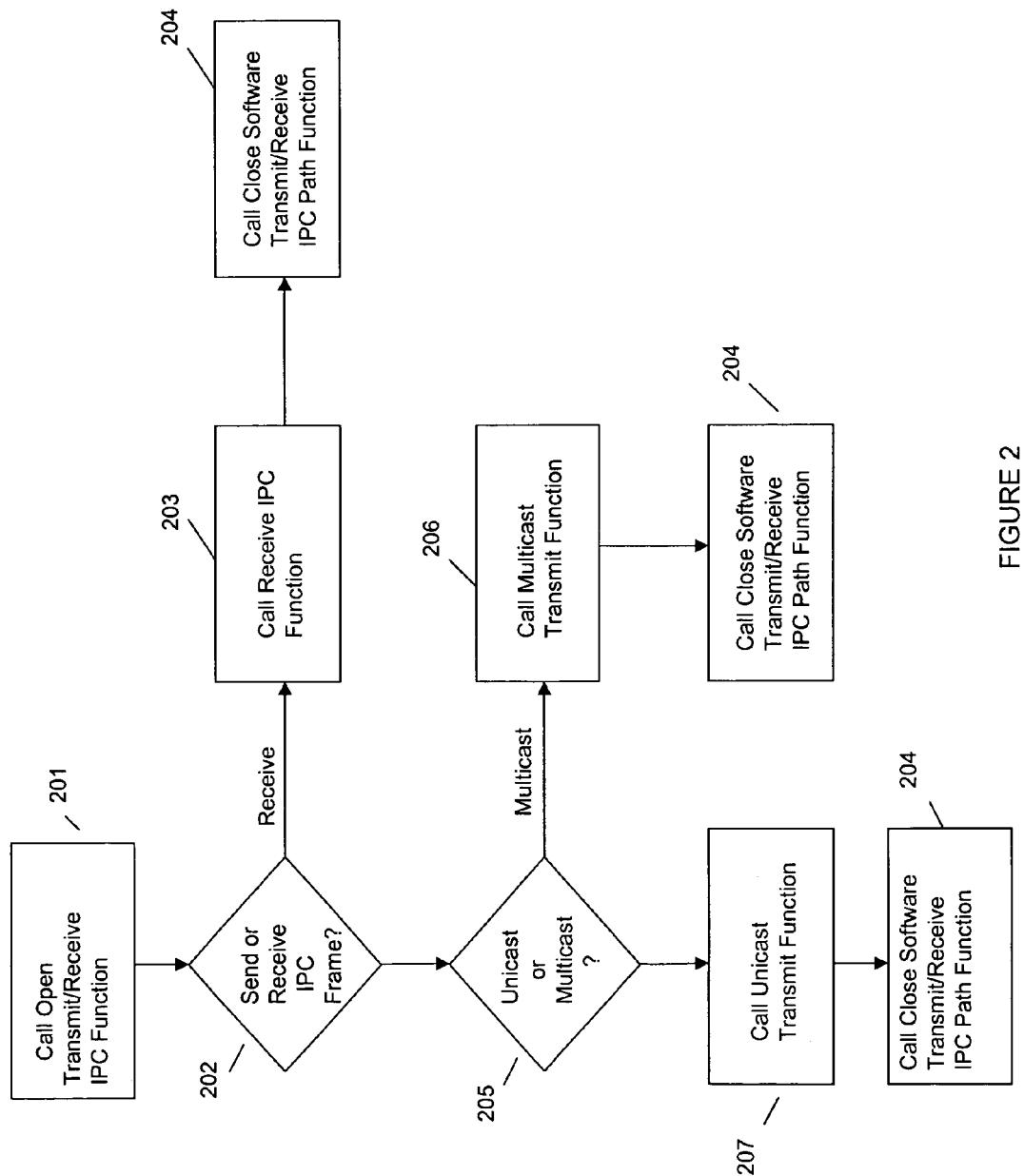
FIG. 2 is a flow diagram showing the logic of an implementation of the invention.

FIG. 2 illustrates an embodiment of this light-weight IPC protocol according to the invention. First, the Open IPC transmit/receive path function is called in function block 201 (see np_ts_IPC_register details previously described). Next, a determination is made in decision block 202 as to whether receiving or sending an IPC frame. If receiving an IPC frame, the receive IPC function is called in function block 203 (see user_rcvIPC_func function description in np_ts_IPC_register details previously described). This is followed by calling the close software transmit/receive IPC path function in function block 204 to deregister the IPC path. If sending and IPC frame, a determination is made in decision block 205 as to whether it is unicast or multicast. If multicast, multicast transmit function is called in function block 206 (see np_ts_sndIPC_multicast details previously described). This is followed by calling the close software transmit/receive IPC path function in function block 204 to deregister the IPC path. If unicast, unicast transmit function is called in function block 207 (see np_ts_sndIPC_unicast). This is followed by calling the close software transmit/receive IPC path function in function block 204 to deregister IPC path.

The novel features of this invention are software based functions (APIs) that enable inter process communication between processors in a network processing environment.

While the invention has been described in terms of a single preferred embodiment, those skilled in the art will recognize that the invention can be practiced with modification within the spirit and scope of the appended claims.

What is claimed is:

1. A method of inter process communication (IPC) between processors in a network processing environment having a data path and a control path for connecting said processors, said inter process communication comprising the steps of:
   a) providing software enabled functions that open and close inter process communication paths for transmitting and receiving of inter process communication frames;
   b) providing software enabled functions that allow said inter process communication frames to be stacklessly transmitted to one or several processors in said network processing environment, wherein said network processing environment has at least two components; and c) upon calling an open software transmit/receive IPC path function, selecting by software either data or control path in said network processing environment to transmit or receive said inter process communication frames, wherein an interface between said two components of the network processing environment can be called synchronously form each of the two components to allow the inter process communication frames to be transmitted stacklessly.

2. The method of inter process communication (IPC) between processors in a network processing environment recited in claim 1, wherein the software enabled functions that open and close inter process communication paths for transmitting and receiving of inter process communication frames perform the steps of:

determining if an IPC path function is a send or receive function; and if a receive function, calling a receive IPC function.

3. The method of inter process communication (IPC) between processors in a network processing environment recited in claim 2, wherein the software enabled functions that allow said inter process communication frames to be transmitted to one or several processors in said network processing environment comprise the steps of:

determining if an IPC frame to be sent is to be unicast or multicast; if multicast, calling a multicast transmit function; but if unicast, calling a unicast transmit function.

4. The method of inter process communication (IPC) between processors in a network processing environment recited in claim 3, wherein after calling one of said receive IPC, multicast transmit or unicast transmit functions, further performing the step of closing a software transmit/receive IPC path function.

5. The method of claim 1, wherein said interprocess communication frames include headers to exchange frame formats.

6. An inter process communication (IPC) system providing communication between processors in a network processing environment having a data path and a control path for connecting said processors, said inter process communication comprising:

a) software enabled functions that open and close inter process communication paths for transmitting and receiving of inter process communication frames;

b) software enabled functions that allow said inter process communication frames to be stacklessly transmitted to one or several processors in said network processing environment, wherein said network processing environment has at least two components; and c) means for selecting by software either data or control path in said network processing environment to transmit or receive said inter process communication frames in response to calling an open software transmit/receive IPC path function, wherein an interface between said two components of the network processing environment can be called synchronously form each of the two components to allow the inter process communication frames to be transmitted stacklessly.

7. The inter process communication (IPC) system providing communication between processors in a network processing environment recited in claim 6, wherein the software enabled functions that open and close inter process communication paths for transmitting and receiving of inter process communication frames comprise:

means for determining if an IPC path function is a send or receive function; and if a receive function, means for calling a receive IPC function.

8. The inter process communication (IPC) system providing communication between processors in a network processing environment recited in claim 7, wherein the software enabled functions that allow said inter process communication frames to be transmitted to one or several processors in said network processing environment comprise:

means for determining if an IPC frame to be sent is to be unicast or multicast;

if multicast, means for calling a multicast transmit function; but if unicast, means for calling a unicast transmit function.

9. The inter process communication (IPC) system providing communication between processors in a network processing environment recited in claim 8, further comprising means closing a software transmit/receive IPC path function after one of said receive IPC, multicast transmit or unicast transmit functions have been called.

10. The method of claim 6, wherein said interprocess communication frames include headers to exchange frame formats.

11. A method of inter process communication (IPC) between processors in a network processing environment having a data path and a control path for connecting said processors, said inter process communication comprising the steps of:

a) providing software enabled functions that open and close inter process communication paths for transmitting and receiving of inter process communication frames;

b) providing software enabled functions that allow said inter process communication frames to be stacklessly transmitted to one or several processors in said network processing environment, wherein said network processing environment has at least two components; and c) upon calling an open software transmit/receive IPC path function, selecting by software either data or control path in said network processing environment to transmit or receive said inter process communication frames, wherein an interface between said two components of the network processing environment can be called synchronously form each of the two components to allow the inter process communication frames to be transmitted stacklessly, wherein the software enabled functions that open and close inter process communication paths for transmitting and receiving of inter process communication frames perform:

determining if an IPC path function is a send or receive function: and if a receive function calling a receive IPC function.

* * * * *